(12) United States Patent
Nun et al.

(10) Patent No.: US 7,399,353 B2
(45) Date of Patent: Jul. 15, 2008

(54) PRODUCTION OF SUSPENSIONS OF HYDROPHOBIC OXIDE PARTICLES

(75) Inventors: Edwin Nun, Billerbeck (DE); Markus Oles, Hattingen (DE); Frank Menzel, Hanau (DE)

(73) Assignee: Degussa AG, Duesseldorf (DE)

( * ) Notice: Subject to any disclaimer, the term of this patent is extended or adjusted under 35 U.S.C. 154(b) by 47 days.

(21) Appl. No.: 10/527,641

(22) PCT Filed: Sep. 26, 2003

(86) PCT No.: PCT/EP03/10722

§ 371 (c)(1),
(2), (4) Date: Mar. 14, 2005

(87) PCT Pub. No.: WO2004/039909

PCT Pub. Date: May 13, 2004

(65) Prior Publication Data

US 2006/0049376 A1 Mar. 9, 2006

(30) Foreign Application Priority Data

Oct. 29, 2002 (DE) ............................... 102 50 328

(51) Int. Cl.
*C04B 14/00* (2006.01)
*C04B 14/04* (2006.01)
*C04B 28/26* (2006.01)
*C09D 1/00* (2006.01)
*C09K 17/40* (2006.01)

(52) U.S. Cl. ............... 106/401; 106/286.4; 106/286.5; 106/287.17; 106/287.34; 106/481; 106/483

(58) Field of Classification Search ............. 106/286.4, 106/286.5, 287.17, 287.34, 401, 481, 483
See application file for complete search history.

(56) References Cited

U.S. PATENT DOCUMENTS

| | | | | |
|---|---|---|---|---|
| 4,102,703 | A * | 7/1978 | Tully | 106/287.14 |
| 5,500,216 | A * | 3/1996 | Julian et al. | 424/401 |
| 5,510,068 | A * | 4/1996 | Parmentier | 264/117 |
| 6,193,795 | B1 * | 2/2001 | Nargiello et al. | 106/484 |
| 6,342,560 | B1 * | 1/2002 | Okel | 524/493 |
| 6,451,941 | B1 * | 9/2002 | Urashima et al. | 526/212 |
| 6,660,363 | B1 * | 12/2003 | Barthlott | 428/141 |
| 6,683,126 | B2 * | 1/2004 | Keller et al. | 524/492 |
| 6,783,807 | B2 * | 8/2004 | Huffer et al. | 427/437 |
| 6,811,856 | B2 | 11/2004 | Nun et al. | |
| 6,852,389 | B2 | 2/2005 | Nun et al. | |
| 6,858,284 | B2 | 2/2005 | Nun et al. | |
| 6,977,094 | B2 | 12/2005 | Oles et al. | |
| 7,083,828 | B2 | 8/2006 | Müller et al. | |
| 2002/0148601 | A1 | 10/2002 | Roos et al. | |
| 2002/0150723 | A1 | 10/2002 | Oles et al. | |
| 2002/0164443 | A1 | 11/2002 | Oles et al. | |
| 2003/0013795 | A1 | 1/2003 | Nun et al. | |
| 2003/0134086 | A1 | 7/2003 | Nun et al. | |
| 2003/0147932 | A1 | 8/2003 | Nun et al. | |
| 2004/0028913 | A1 | 2/2004 | Hennige et al. | |
| 2004/0154106 | A1 | 8/2004 | Oles et al. | |
| 2005/0070193 | A1 | 3/2005 | Hennige et al. | |
| 2005/0084653 | A1 | 4/2005 | Nun et al. | |
| 2005/0103457 | A1 | 5/2005 | Nun et al. | |
| 2005/0112326 | A1 | 5/2005 | Nun et al. | |
| 2005/0118433 | A1 | 6/2005 | Oles et al. | |
| 2005/0163951 | A1 | 7/2005 | Oles et al. | |
| 2005/0167877 | A1 | 8/2005 | Nun et al. | |
| 2005/0205830 | A1 | 9/2005 | Oles et al. | |
| 2005/0208269 | A1 | 9/2005 | Nun et al. | |
| 2005/0227045 | A1 | 10/2005 | Oles et al. | |
| 2005/0253302 | A1 | 11/2005 | Nun et al. | |
| 2006/0049376 | A1 | 3/2006 | Nun et al. | |
| 2007/0014970 | A1 * | 1/2007 | Nun et al. | 428/141 |

FOREIGN PATENT DOCUMENTS

| DE | 101 18 346 | 10/2002 |
|---|---|---|
| EP | 0 637 616 | 2/1995 |
| EP | 1 249 468 | 10/2002 |

OTHER PUBLICATIONS

U.S. Appl. No. 11/312,557, filed Dec. 21, 2005, Oles et al.
U.S. Appl. No. 11/321,285, filed Dec. 21, 2005, Oles et al.
U.S. Appl. No. 10/546,979, filed Aug. 26, 2005, Nun et al.
U.S. Appl. No. 11/312,340, filed Dec. 21, 2005, Hennige et al.
U.S. Appl. No. 11/312,469, filed Dec. 21, 2005, Nun et al.

(Continued)

*Primary Examiner*—J. A. Lorengo
*Assistant Examiner*—Patricia L Hailey
(74) *Attorney, Agent, or Firm*—Oblon, Spivak, McClelland, Maier & Neustadt, P.C.

(57) ABSTRACT

Disclosed are a process for producing a suspension of hydrophobic oxidic particles which has a defined, adjustable viscosity, which comprises suspending low structured hydrophobic oxidic particles in at least one organic suspension agent and then adding from 0.05% to 15% by weight based on the suspension medium of high structured hydrophobic oxidic particles, a suspension of hydrophobic oxidic particles which has a defined, adjustable viscosity and the use thereof for producing soil and water repellent coatings on articles.

28 Claims, No Drawings

OTHER PUBLICATIONS

U.S. Appl. No. 10/526,559, filed Mar. 4, 2005, Nun et al.
U.S. Appl. No. 10/527,641, filed Mar. 14, 2005, Nun et al.
U.S. Appl. No. 09/241,077, filed Feb. 1, 1999, Peters et al.
U.S. Appl. No. 10/551,841, filed Oct. 3, 2005, Nun et al.
U.S. Appl. No. 10/556,092, filed Nov. 9, 2005, Oles et al.
U.S. Appl. No. 10/575,268, filed Apr. 11, 2006, Hennige et al.
U.S. Appl. No. 10/588,952, filed Aug. 10, 2006, Nun et al.
U.S. Appl. No. 11/572,548, filed Jan. 23, 2007, Nun et al.

* cited by examiner

PRODUCTION OF SUSPENSIONS OF HYDROPHOBIC OXIDE PARTICLES

This invention relates to a process for producing a suspension of hydrophobic oxidic particles which has a defined, adjustable viscosity, to a suspension of hydrophobic oxidic particles which has a defined, adjustable viscosity and to the use thereof for producing soil and water repellent coatings on articles.

Suspensions of hydrophobic nanostructured particles are used in the production of soil and water repellent coatings on articles and textile sheet materials. These coatings are produced by applying hydrophobic particles to the surface of an article, thereby creating a surface structure having elevations on the surface of the article, which has soil and water repellent properties.

The principle of self cleaning coatings is common knowledge. Good surface self cleaning requires the surface to have a certain roughness as well as a very hydrophobic surface. A suitable combination of structure and hydrophobicity will ensure that even small amounts of moving water will entrain soil particles adhering to the surface and so clean the surface (WO 96/04123; U.S. Pat. No. 3,354,022).

EP 0 933 388 discloses a process for producing structured surfaces having hydrophobic properties by producing a negative mold by photolithography, using this negative mold to emboss a polymeric foam and then hydrophobicizing the polymeric foam with fluoroalkylsilanes.

EP-A 0 909 747 describes a process for conferring the property of self cleaning on ceramic structures, roof tiles for example, by applying a dispersion of clay particles in an organic silicone resin solution to the ceramic structure and then curing the coating.

JP 7328532-A discloses a coating process wherein finely divided particles having a hydrophobic surface are applied to a moist lacquer and the latter is cured. This provides water rejecting surfaces.

DE 100 22 246 A1 describes a process utilizing hydrophobic nanostructured particles together with an adhesive or an adhesivelike component in spray form. This process is used to create structured surfaces which, however, are not durable.

The prior art methods for creating low wettable surfaces are either very costly and inconvenient or lead to unsatisfactory results. The creation of a structured surface by embossing processes is costly and inconvenient and can be economically used only in the case of planar surfaces. Surfaces where structuring is achieved by subsequent application of hydrophobic particles are frequently difficult to reproduce or lack sufficient mechanical strength. Moreover, this process too is very costly and inconvenient. Furthermore, there is frequently a need to use organofluorine compounds or fluorous polymers, which are not only very costly but also ecologically extremely dubious.

German patent application DE 101 35 157 describes a process for applying a self cleaning coating to textiles. In this process, hydrophobic nanostructured pyrogenic silicas are mixed into dry cleaning agents, for example perchloroethylene, tetrachloroethylene or naphtha, and a self cleaning water repellent effect is generated on the garments following the dry cleaning. This process too employs ecologically dubious halogenated solvents.

One way of producing self cleaning textile fabrics having water repellent surfaces is described in German patent application DE 101 18 346. The hydrophobic structured particle suspensions described in this application have the disadvantage that these suspensions can be applied to appropriate textiles only by means of dipping processes or transfer processes and the particles become firmly anchored in the polymer fiber surface as a result of incipient solubilization of the polymeric fiber.

It is an object of the present invention to provide a process for producing a suspension of hydrophobic oxidic particles which has a defined, adjustable viscosity in order thereby to be able to utilize further application processes for suspensions of hydrophobic oxidic particles, for example the knife coating, as well as the familiar processes, such as dipping or spraying for example.

It was found that, surprisingly, suspensions of hydrophobic oxidic particles having a defined, adjustable viscosity are obtainable by suspending low structured hydrophobic oxidic particles in at least one organic suspension agent and then adding from 0.05% to 15% by weight based on the suspension medium of high structured hydrophobic oxidic particles. The process of the invention makes it possible to produce suspensions which by virtue of their adjustable viscosity permit the use of application processes which represent a lower capital investment and a lower environmental threat due to evaporating suspension agents. It is very particularly advantageous that suspensions for knife coating operations on textiles or for textile coatings are now available by virtue of the subject inventive process.

The present invention accordingly provides a process for producing a suspension of hydrophobic oxidic particles which has a defined, adjustable viscosity, which comprises suspending low structured hydrophobic oxidic particles in at least one organic suspension agent and then adding from 0.05% to 15% by weight based on the suspension medium of high structured hydrophobic oxidic particles.

The present invention likewise provides suspensions of hydrophobic oxidic particles having a defined, adjustable viscosity and the use thereof for the production of soil and water repellent coatings on articles.

The process of the invention makes suspensions of hydrophobic oxidic particles having a defined, adjustable viscosity available. It is accordingly now possible to produce hydrophobic oxidic particle suspensions having a higher viscosity than as per the prior art and also pastes of hydrophobic oxidic particles. The suspensions produced with the aid of the process of the invention therefore permit the use of other application processes, for example knife coating. In the prior art, the suspensions of hydrophobic oxidic particles are applied by spraying or by dipping the article to be coated into the suspension of the hydrophobic oxidic particles. This entails higher capital investment costs for the application of the hydrophobic oxidic particles and also a higher environmental threat due to the higher fraction of organic suspension agent. The suspensions of the invention are particularly useful for the self cleaning and water repellent coating of textiles, since the prior art of these coatings already employs a knife coating operation, for example to apply polyurethane coating compositions.

The process for producing a suspension of hydrophobic oxidic particles which has a defined, adjustable viscosity, which comprises suspending low structured hydrophobic oxidic particles in at least one organic suspension agent and then adding preferably from 0.05% to 15% by weight, preferably from 1% to 12% by weight and more preferably from 2% to 10% by weight based on the suspension medium of high structured hydrophobic oxidic particles.

The process of the invention uses both low and high structured, preferably hydrophobic pyrogenic oxidic particles comprising a material selected from silicon oxide, aluminum oxide, zirconium oxide, titanium oxide or a mixture thereof, or hydrophobic precipitated oxidic particles selected from silicon oxide, aluminum oxide, zirconium oxide, titanium oxide or a mixture thereof, preferably hydrophobic precipitated silicas. The process of the invention more preferably utilizes hydrophobic pyrogenic silicas. A particular embodiment of the process according to the invention employs a mixture of low structured hydrophobic oxidic particles. But it is also possible to use a mixture of high structured hydrophobic oxidic particles.

The hydrophobicity of the oxidic particles can be inherent or the oxidic particles can be hydrophobicized in a conventional manner (Schriftenreihe Pigmente, Nummer 18, from Degussa AG). This is preferably effected by a treatment with at least one compound selected from the group of the alkylsilanes, alkyldisilazanes, for example with hexamethyldisilizane, or perfluoroalkylsilanes.

In a first step of the process according to the invention, preferably from 0.05% to 2.5% by weight, more preferably from 0.1% to 2.0% by weight and most preferably from 0.5% to 1.2% by weight based on the suspension medium of low structured hydrophobic oxidic particles is suspended in at least one organic suspension agent.

Useful suspension agents for the process of the invention include alcohols, ketones, ethers, esters, aliphatic or aromatic hydrocarbons, amides or sulfoxides. In a particular embodiment of the process according to the invention, it is also possible to use mixtures of the abovementioned suspension agents and preference is given to using a suspension medium which includes water as well as the organic suspension agent or the organic suspension mixture.

Low structured hydrophobic oxidic particles for the purposes of this invention are hydrophobic oxidic particles which, compared with the corresponding high structured hydrophobic oxidic particles, have an at least 30% reduced dibutyl phthalate (DBP) absorption, as measured in accordance with German standard specification DIN 53 601. Furthermore, the low structured hydrophobic oxidic particles used in the process of the invention have an at least 50% higher tamped density (as measured in accordance with German standard specification DIN 53 194) than the correspondingly high structured hydrophobic oxidic particles. For example, Aerosil R 812 S, a high structured hydrophobic pyrogenic silica, has a tamped density of 50 g/l, whereas Aerosil VP LE 8241, a low structured hydrophobic pyrogenic silica, has a tamped density of 140 g/l.

Low structured hydrophobic oxidic particles can be produced by a dry grinding process as described in EP 0 637 616 B1 or U.S. Pat. No. 5,959,005 from high structured hydrophobic oxidic particles; the dry grinding process referred to is an intensive grinding process which occasions a destructuring of the oxidic particles as well as, as usual, reducing particle size. This destructuring is irreversible.

A particular embodiment of the process according to the invention utilizes Aerosils® not only as low but also as high structured hydrophobic pyrogenic oxidic particles. The preferred low structured hydrophobic Aerosil® is Aerosil® VP LE 8241. Aerosil® R 812 S is used as high structured hydrophobic Aerosil® in this particular embodiment of the process according to the invention.

The low structured hydrophobic oxidic particles used in the process of the invention preferably have a surface having an irregular fine structure in the nanometer range, ie in the range from 1 nm to 1 000 nm, preferably from 2 nm to 750 nm and most preferably from 10 nm to 100 nm. Fine structure refers to structures having heights, jags, fissures, ridges, cracks, undercuts, notches and/or holes in the abovementioned spacings and ranges. The fine structure of the low structured hydrophobic oxidic particles may preferably have elevations having an aspect ratio of more than 1 and more preferably of more than 1.5. The aspect ratio is in turn defined as the ratio of maximum height to maximum width of the elevation; in the case of ridges or other elongate elevations, the width at right angles to the longitudinal direction is used.

Low structured hydrophobic oxidic particles used in the process of the invention preferably have an average particle diameter from 0.005 μm to 100 μm, preferably from 0.01 μm to 50 μm and more preferably from 0.01 μm to 30 μm. It is thus even possible to use low structured hydrophobic oxidic particles which from primary particles form agglomerates or aggregates having a size from 0.02 μm to 100 μm in the suspension medium.

The hydrophobic oxidic particles are preferably suspended using high inputs of shearing energy, for example by means of a dissolver disc, to break down any agglomerates present. It may similarly be preferable to use turbulence-increasing internals, such as baffles or other obstructions to avoid the formation of standing waves. The Reynolds number is preferably above 2320. The Richardson number calculates the ratio of the magnitude of thermal stratification to the magnitude of shear in a flow. It is therefore a number which measures the ratio of the variables responsible for the spread or decay of turbulence. The Richardson number relates to a local gradient at one point in the flow, and for the process of the invention the Richardson number is not more than 0.25. A definition of the Richardson number is given, inter alia, in H. Kobus (lecture script for "Hydraulics of Natural Water Systems" [in German], in the Hydraulics and Ground Water Department at the Institute of Hydraulic Engineering at Stuttgart University).

Depending on the amount of high structured hydrophobic oxidic particles which is added, it is possible to prepare suspensions having dynamic viscosities of preferably from 1.0 to 1 000 mPa s, more preferably from 1 to 500 mPa s and most preferably from 1 to 400 mPa s at a shear rate of more than 20 $s^{-1}$. When an amount of high structured hydrophobic oxidic particles, as of Aerosil® R 812 S for example, is ≧5% by weight based on the suspension medium, it is even possible to prepare suspensions having newtonion flow characteristics by the process of the invention.

The inventive suspension of hydrophobic oxidic particles which has a defined, adjustable viscosity is suitable for low structured hydrophobic oxidic particles and preferably from 0.05% to 15% by weight, more preferably from 1% to 12% by weight and most preferably from 2% to 10% by weight based on the suspension medium of high structured hydrophobic oxidic particles being present in suspension in at least one organic suspension agent.

The suspension of the invention preferably comprises from 0.05% to 2.5% by weight, more preferably from 0.1% to 2.0% by weight and most preferably from 0.5% to 1.2% by weight based on the suspension medium of low structured hydrophobic oxidic particles.

The suspension of the invention is preferably prepared by the abovedescribed process of the invention.

The suspension of the invention includes both low and high structured, preferably hydrophobic pyrogenic oxidic particles comprising a material selected from silicon oxide, aluminum oxide, zirconium oxide, titanium oxide or a mixture thereof, or hydrophobic precipitated oxidic particles selected from silicon oxide, aluminum oxide, zirconium oxide, titanium oxide or a mixture thereof, preferably hydrophobic precipitated silicas. The suspension of the invention more preferably includes hydrophobic pyrogenic silicas. A particular embodiment of the suspension according to the invention includes a mixture of low structured hydrophobic oxidic particles. But the suspension according to the invention also includes a mixture of high structured hydrophobic oxidic particles.

The hydrophobicity of the oxidic particles can be inherent or the oxidic particles can have been hydrophobicized in a conventional manner (Schriftenreihe Pigmente, Nummer 18, from Degussa AG). This is preferably effected by a treatment with at least one compound selected from the group of the alkylsilanes, alkyldisilazanes, for example with hexamethyidisilizane, or perfluoroalkylsilanes.

Suspension agents for the suspension of the invention include alcohols, ketones, ethers, esters, aliphatic or aromatic hydrocarbons, amides or sulfoxides. The suspension according to the invention preferably contains a mixture of the abovementioned suspension agents, more preferably however, it contains a suspension medium which includes water as well as the organic suspension agent or the organic suspension mixture.

Low structured hydrophobic oxidic particles for the purposes of this invention are hydrophobic oxidic particles which, compared with the corresponding high structured hydrophobic oxidic particles, have an at least 30% reduced dibutyl phthalate (DBP) absorption, as measured in accordance with German standard specification DIN 53 601. Furthermore, the low structured hydrophobic oxidic particles contained in the suspension of the invention have an at least 50% higher tamped density (as measured in accordance with German standard specification DIN 53 194) than the correspondingly high structured hydrophobic oxidic particles. For example, Aerosil R 812 S, a high structured hydrophobic pyrogenic silica, has a tamped density of 50 g/l, whereas Aerosil VP LE 8241, a low structured hydrophobic pyrogenic silica, has a tamped density of 140 g/l.

Low structured hydrophobic oxidic particles can be produced by a dry grinding process as described in EP 0 637 616 B1 or U.S. Pat. No. 5,959,005 from high structured hydrophobic oxidic particles; the dry grinding process referred to is an intensive grinding process which occasions a destructuring of metal oxides as well as, as usual, reducing particle size. This destructuring is irreversible.

The suspension according to the invention preferably includes Aerosils® not only as low but also as high structured hydrophobic oxidic particles. The preferred low structured hydrophobic Aerosil® of this suspension is Aerosil® VP LE 8241. Aerosil® R 812 S is used as high structured hydrophobic Aerosil® in this particular embodiment of the suspension according to the invention.

The low structured hydrophobic oxidic particles contained in the suspension of the invention preferably have a surface having an irregular fine structure in the nanometer range, i.e. in the range from 1 nm to 1 000 nm, preferably from 2 nm to 750 nm and most preferably from 10 nm to 100 nm. Fine structure refers to structures having heights, jags, fissures, ridges, cracks, undercuts, notches and/or holes in the abovementioned spacings and ranges. The fine structure of the low structured hydrophobic oxidic particles may preferably have elevations having an aspect ratio of more than 1 and more preferably of more than 1.5. The aspect ratio is in turn defined as the ratio of maximum height to maximum width of the elevation; in the case of ridges or other elongate elevations, the width at right angles to the longitudinal direction is used.

Low structured hydrophobic oxidic particles used in the suspension of the invention preferably have an average particle diameter from 0.005 µm to 100 µm, preferably from 0.01 µm to 50 µm and more preferably from 0.01 µm to 30 µm. It is thus even possible for the suspension of the invention to contain low structured hydrophobic oxidic particles which from primary particles form agglomerates or aggregates having a size from 0.02 µm to 100 µm in the suspension medium.

Depending on the amount of high structured hydrophobic oxidic particles which is contained, the suspension according to the invention having a dynamic viscosity of preferably from 1.0 to 1 000 mPa s, more preferably from 1 to 500 mPa s and most preferably from 1 to 400 mPa s at shear rates of more than 20 $s^{-1}$. When the amount of high structured hydrophobic oxidic particles, as of Aerosil® R 812 S for example, is ≧5% by weight based on the suspension medium, it is even possible for the suspension of the invention to have newtonion flow characteristics.

The suspensions of the invention and the suspensions produced using the process of the invention can be used for producing soil and water repellent coatings on articles, the coating operation applying hydrophobic particles to the surface of the articles should thereby create a surface structure having elevations on the surface of the articles, which has soil and water repellent properties. In the coating operation of the articles, a suspension of the invention or a suspension produced using a process of the invention is applied to at least one surface of an article and the suspension medium is subsequently removed.

In a particular embodiment of the use of the suspension of the invention or of a suspension produced using the process of the invention, for producing soil and water repellent coatings, the suspension of the invention or a suspension produced using the process of the invention is applied to the surface to be coated, preferably to a surface of textiles, by knife coating. The suspension of the invention or a suspension produced using the process of the invention is very useful for producing coated textile sheet materials which have water and soil repellent properties and for producing soil and water repellent coatings on textiles.

The suspensions of the invention or the suspensions produced using the process of the invention can by used for producing apparel, especially for producing protective apparel, rain apparel and safety apparel having a signaling effect, industrial textiles, especially for the production of covering tarpaulins, tenting, protective covers, truck tarpaulins and textile building fabrics, especially for the production of sunshade roofs, for example awnings, sunshades, parasols.

The examples which follow will now more particularly describe the process of the invention and also the suspensions of the invention without the invention being limited to this embodiment.

EXAMPLE 1

1 part by weight of Aerosil® VP LE 8241 (Degussa AG) were suspended in 100 parts by weight of denatured absolute ethanol in an Ultraturax. This suspension of Aerosil® VP LE 8241 in ethanol was admixed with 5 parts by weight of Aerosil® R 812 S (Degussa AG) by vigorous mixing using an Ultraturax.

EXAMPLE 2

The example 1 suspension of Aerosil® VP LE 8241 in denatured ethanol was applied in a layer thickness of 50 µm to a Kraft laminating paper from SCA Flex Pack Papers GmbH by knife coating. After the suspension agent had evaporated at room temperature, a polyurethane dispersion from Novotex Italy as per table 1 was applied to the pretreated laminating paper in a layer thickness of 50 µm by thin knife coating. A tricot fabric formed from a nylon fabric (Decotex from Ibena Textilwerke Beckmann GmbH) was laminated into the still moist surface of the polyurethane coating. The polyurethane coating was thermally cured at 150° C. for 2 minutes and then the laminating paper was removed.

TABLE 1

Experimental parameters of example 2

Polyurethane dispersion

| Run | Designation | Type | Characterization of lotus effect |
|---|---|---|---|
| 2.1 | Larithane ® AL 227 | aliphatic | +++ |
| 2.2 | Laripur ® SH1020 in methyl ethyl ketone/-dimethylformamide | | ++ |
| 2.3 | Impranil ® ENB-03 | aromatic | ++ |
| 2.4 | Larithane ® MA 80 | aromatic | ++ |

The coated textile sheet materials were initially characterized by visual inspection. +++ means that almost complete water droplets form. The roll-off angle is below 10°. ++ means that the formation of the water droplets is not ideal, the roll-off angle is below 20°.

EXAMPLE 3

1 part by weight of Aerosil® VP LE 8241 was suspended in 100 parts by weight of an organic suspension agent in an Ultraturax. This suspension of Aerosil® VP LE 8241 was admixed with Aerosil® R 812 S by vigorous stirring using an Ultraturax. The suspension obtained was then knife coated onto a polyester blend fabric (Decotex from Ibena Textilwerke Beckmann GmbH) in a layer thickness of 50 µm. The suspension medium was subsequently evaporated at room temperature and in a drying cabinet.

TABLE 2

Experimental parameters of example 3

| Organic suspension agent | Aerosil ® R 812 S in parts by weight | Characterization of lotus effect |
|---|---|---|
| Isopropanol | 3 | ++ |
| Dimethyl sulfoxide | 3 | ++ |
| | 5 | +++ |
| Toluene | 3 | +++ |
| | 5 | +++ |
| Tetrahydrofuran | 1 | ++ |
| | 3 | +++ |
| Cyclohexanone | 1 | ++ |
| | 3 | ++ |

The coated textile sheet materials were initially characterized by visual inspection. +++ means that almost complete water droplets form. The roll-off angle is below 10°. ++ means that the formation of the water droplets is not ideal, the roll-off angle is below 20°.

EXAMPLE 4 a.) 5 parts by weight of Aerosil® R 812 S were suspended in 100 parts by weight of toluene and vigorously mixed in an Ultraturax. The suspension obtained was knife coated onto a polyester blend fabric (Decotex from Ibena Textilwerke Beckmann GmbH) in a layer thickness of 50 µm. The suspension medium was subsequently evaporated at room temperature and in a drying cabinet. When the coated fabric had dried, it exhibited defective areas. The lotus effect was impossible to determine because of the poor adhesion of the oxidic particles to the fabric.

b.) 1 part by weight of Aerosil® VP LE 8241 was suspended in 100 parts by weight of toluene in an Ultraturax. This suspension of Aerosil® VP LE 8241 was admixed with Aerosil® R 812 S by vigorous mixing using an Ultraturax. The suspension obtained was subsequently knife coated onto a polyester blend fabric (Decotex from Ibena Textilwerke Beckmann GmbH) using a layer thickness of 50 µm. The suspension medium was subsequently evaporated at room temperature and in a drying cabinet. The thus coated textile fabrics were initially characterized by visual inspection and were found to produce a lotus effect of +++. This means that water droplets form almost completely and the roll-off angle is below 10°.

EXAMPLE 5

Example 1 was repeated to produce suspensions of Aerosil® VP LE 8241 and Aerosil® R 812 S using various solvents before the dymamic viscosity was measured at a temperature of 23° C. and a shear gradient of $\gamma=0.3$-$50$ s$^{-1}$ using a Haake RS75 rheometer and an HC 60/2° plate-cone measuring system. The results and the respective composition of the suspension are summarized in table 3.

TABLE 3

| No. | Aerosil VPLE 8241 [in %] | Aerosil R 812 S [in %] | Solvent | Dynamic viscosity in η mPa s | Comment |
|---|---|---|---|---|---|
| 5.1 | 1.0 | 1.0 | ethanol | 1.6 | near-newtonian flow |
| 5.2 | 1.0 | 3.0 | ethanol | 4.3 | near-newtonian flow |
| 5.3 | 1.0 | 5.0 | ethanol | 17 | newtonian flow |
| 5.4 | 1.25 | 7.5 | ethanol | 370 | newtonian flow with yield point |
| 5.5 | 1.0 | 1.0 | DMF | 1.6 | near-newtonian flow |
| 5.6 | 1.0 | 3.0 | DMF | 5.0 | near-newtonian flow |
| 5.7 | 1.0 | 5.0 | DMF | 52 | newtonian flow |
| 5.8 | 1.25 | 11.25 | DMF | 340 | newtonian flow with yield point |
| 5.9 | 1.0 | 1.0 | toluene | 1.2 | near-newtonian flow |
| 5.10 | 1.0 | 3.0 | toluene | 3.5 | near-newtonian flow |
| 5.11 | 1.0 | 5.0 | toluene | 9.5 | newtonian flow |
| 5.12 | 1.25 | 8.75 | toluene | 180 | newtonian flow with yield point |

What is claimed is:

1. A process for producing a suspension of hydrophobic oxide particles that has a defined, adjustable viscosity, wherein said process
consists of
suspending low structured hydrophobic oxidic particles in a suspension medium, and
adding from 0.05 to 15% by weight based on the suspension medium, of high structured oxidic particles,
wherein the low structured hydrophobic oxidic particles are hydrophobic oxidic particles that, compared with the corresponding high structured hydrophobic oxidic particles, have an at least 30% reduced dibutyl phthalate absorption and an at least 50% higher tamped density,
wherein the suspension medium consists of at least one organic suspension agent, and optionally, at least one suspension agent selected from the group consisting of water, alcohols, ketones, ethers, esters, aliphatic hydrocarbons, aromatic hydrocarbons, amides, sulfoxides, and combinations thereof, and wherein the at least one organic suspension agent is selected from the group consisting of dimethylsulfoxide, toluene, tetrahydrofuran, cyclohexanone, dimethylformamide, and combinations thereof.

2. The process of claim 1, wherein the hydrophobic oxidic particles are hydrophobic pyrogenic oxidic particles or hydrophobic precipitated oxidic particles.

3. The process of claim 2, comprising hydrophobic pyrogenic oxide particles, wherein the hydrophobic pyrogenic oxidic particles comprise a material selected from the group consisting of silicon oxide, aluminum oxide, zirconium oxide, titanium oxide, and a mixture thereof.

4. The process of claim 2, comprising hydrophobic pyrogenic oxide particles, wherein the hydrophobic pyrogenic oxidic particles are hydrophobic pyrogenic silicas.

5. The process of claim 1, wherein the low structured hydrophobic oxidic particles are added in an amount from 0.05% to 2.5% by weight based on the suspension medium.

6. A suspension produced by the process as claimed in claim 1.

7. The suspension of claim 6, wherein the suspension comprises from 0.05% to 2.5% by weight of hydrophobic low-structured oxidic particles based on the suspension medium.

8. The suspension of claim 6, comprising a dynamic viscosity from 1.0 to 1,000 mPa s at a shear rate of greater than $20\ s^{-1}$.

9. The suspension of claim 6, wherein the suspension medium comprises water as well as the at least one organic suspension agent.

10. A method for producing a soil and water repellent coating on at least one surface of an article comprising
applying the suspension of claim 6 to the at least one surface of the article, and
removing the suspension medium,
thereby producing the soil and water repellent coating on the at least one surface of the article.

11. The method of claim 10, wherein the suspension is applied by knife coating.

12. The method of claim 10, wherein the article is a textile.

13. The method of claim 10, wherein the article is selected from the group consisting of apparel, an industrial textile, and a textile building fabric.

14. The method of claim 10, wherein the suspension is in the form of a paste.

15. The process of claim 1, wherein the suspension is in the form of a paste.

16. The process of claim 1, wherein the suspension medium additionally comprises at least one solvent selected from the group consisting of water, alcohols, ketones, ethers, esters, aliphatic hydrocarbons, aromatic hydrocarbons, amides, sulfoxides, and combinations thereof.

17. The process of claim 1, wherein the suspension medium comprises water as well as the at least one organic suspension agent.

18. A suspension of hydrophobic oxidic particles suspended in a suspension medium, wherein the suspension has a defined, adjustable viscosity, the suspension consisting of
low structured hydrophobic oxidic particles, and from 0.05% to 15% by weight based on the suspension medium, of high structured hydrophobic oxidic particles,
wherein the low structured hydrophobic oxidic particles are hydrophobic oxidic particles that, when compared with the corresponding high structured hydrophobic oxidic particles, have an at least 30% reduced dibutyl phthalate absorption and an at least 50% high tamped density,
wherein the suspension medium consists of at least one organic suspension agent, and optionally, at least one suspension agent selected from the group consisting of water, alcohols, ketones, ethers, esters, aliphatic hydrocarbons, aromatic hydrocarbons, amides, sulfoxides, and combinations thereof, and
wherein the at least one organic suspension agent is selected from the group consisting of, toluene, cyclohexanone, and combinations thereof.

19. The suspension of claim 18, wherein the suspension comprises from 0.05% to 2.5% by weight of hydrophobic low-structured oxidic particles based on the suspension medium.

20. The suspension of claim 18, comprising a dynamic viscosity from 1.0 to 1,000 mPa s at a shear rate of greater than $20\ s^{-1}$.

21. The suspension of claim 18, wherein the suspension medium comprises water as well as the organic suspension agent.

22. A method for producing a soil and water repellent coating on at least one surface of an article comprising
applying the suspension of claim 18 to the at least one surface of the article, and
removing the suspension medium,
thereby producing the soil and water repellent coating on the at least one surface of the article.

23. The method of claim 22, wherein the suspension is applied to the at least one surface of the article by knife coating.

24. The method of claim 22, wherein the article is a textile.

25. The method of claim 22, wherein the article is selected from the group consisting of apparel, an industrial textile, and a textile building fabric.

26. The method of claim 22, wherein the suspension is in the form of a paste.

27. The suspension of claim 18, wherein the suspension is in the form of a paste.

28. The suspension of claim 18, wherein the suspension medium additionally comprises at least one suspension agent selected from the group consisting of water, alcohols, ketones, ethers, esters, aliphatic hydrocarbons, aromatic hydrocarbons, amides, sulfoxides, and combinations thereof.

* * * * *